United States Patent
Northcutt et al.

(10) Patent No.: US 6,311,081 B1
(45) Date of Patent: Oct. 30, 2001

(54) LOW POWER OPERATION IN A RADIOTELEPHONE

(75) Inventors: John Northcutt, Chapel Hill; Peter Holmqvist, Apex, both of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/396,720

(22) Filed: Sep. 15, 1999

(51) Int. Cl.$^7$ .................................................. H04B 1/38
(52) U.S. Cl. .......................... 455/574; 455/343; 455/703; 370/311
(58) Field of Search .................... 455/38.3, 343, 455/572, 574, 425, 403, 550, 703; 370/311

(56) References Cited

U.S. PATENT DOCUMENTS

| | | | |
|---|---|---|---|
| 5,416,435 | 5/1995 | Jokinen et al. | 323/113 |
| 5,590,133 | * 12/1996 | Billstrom et al. | 370/349 |
| 5,666,355 | * 9/1997 | Huah et al. | 370/311 |
| 5,845,204 | * 12/1998 | Chapman et al. | 455/343 |
| 5,910,944 | * 6/1999 | Callicotte et al. | 370/311 |
| 5,950,120 | * 7/2000 | Gardner et al. | 455/343 |
| 5,950,131 | * 9/1999 | Vilmur | 455/434 |
| 5,995,820 | * 11/1999 | Young et al. | 455/343 |
| 6,009,319 | 12/1999 | Khullar et al. | 455/343 |
| 6,088,602 | * 7/2000 | Banister | 455/574 |
| 6,134,457 | * 10/2000 | Ha et al. | 455/572 |
| 6,216,019 | * 4/2001 | Gibbons et al. | 455/574 |

FOREIGN PATENT DOCUMENTS

| | | | |
|---|---|---|---|
| 586 256 A2 | 3/1994 | (EP) . | |
| 726 687 A1 | 8/1996 | (EP) . | |
| 758 768 A2 | 2/1997 | (EP) . | |
| 0924947 | 6/1999 | (EP) | H04Q/7/32 |
| 2 545 623 | 12/1974 | (FR) . | |

* cited by examiner

*Primary Examiner*—William Trost
*Assistant Examiner*—Congvan Tran
(74) *Attorney, Agent, or Firm*—Coats & Bennett, P.L.L.C.

(57) ABSTRACT

Power consumption during low-power sleep mode in a radiotelephone (104) is minimized. At a predetermined wake-up time, temperature of the radiotelephone is determined (706). A variable wake-up duration is set in response to the temperature (708). After the variable wake-up duration, the radiotelephone returns to a normal operational mode (730). In this manner, circuitry remains in the low-power state as long as possible. Further, a low-resolution secondary timer is used to measure the duration of the sleep period. After the duration timed by the secondary timer, a second duration is timed by a high-resolution primary timer. A timing calibration duration is then timed and a sleep mode is exited in synchronization with system timing.

16 Claims, 6 Drawing Sheets

LOW POWER OPERATION IN A RADIOTELEPHONE

BACKGROUND OF THE INVENTION

The present invention relates generally to reducing power consumption in portable electronic devices such as radiotelephones. More particularly, the present invention relates to controlling the duration of a low-power sleep mode in a radiotelephone.

Many communication devices are portable and operate on battery power. An example of such a communication device is a radiotelephone. A radiotelephone is a mobile or portable radio which provides two-way radio communication with fixed radio equipment in a radiotelephone system. To improve portability and user convenience, the radiotelephone is powered by a rechargeable battery.

One design goal for radiotelephones is minimization of power consumption from the battery. This permits use of physically smaller, lighter batteries. Further, power consumption reduction extends the operating time of the radiotelephone. Reduced power consumption is very important in a consumer product such as a radio telephone.

To minimize power consumption it is known to place the radiotelephone in a low-power sleep mode. In such a mode, power is removed from all unnecessary circuitry. The sleep mode is extended for as long as possible while ensuring the liable information.

Many radiotelephones must be synchronized with the timing of the system in which they operate. Synchronization is necessary, for example to locate and read a paging channel broadcast by the system to indicate an incoming call for the radiotelephone. Thus, there is a need to retain or recover timing information even while in the low-power sleep mode.

Accordingly, there is a need for an improved method and apparatus for maximizing duration of sleep mode while ensuring synchronization with system timing upon exiting the sleep mode.

BRIEF SUMMARY OF THE INVENTION

By way of introduction, in one embodiment, a radiotelephone accommodates the varying speed at which its circuits wake up from the sleep mode. A microprocessor or other hardware circuit is used to first sense the temperature of the sleep timer or sleeping hardware. This temperature information is used to program the sleep timer. Circuitry that needs a longer time to return to stable operation on power-up will be started first. This permits most circuitry to remain powered down as long as possible. In a second embodiment, the sleep mode uses a special sleep timer to wake up the timing generator at the end of a sleep cycle. The sleep mode uses a primary clock and a secondary clock. The primary clock is a high-frequency, high-precision clock while the secondary clock is a low-frequency, lower-precision clock generated by a low-power oscillator. The sleep timer counts a number of secondary clock pulses to measure the length of the sleep period. The secondary clock pulses are padded with a programmable number of primary clock pulses to achieve an accurate sleep period.

DETAILED DESCRIPTION OF THE PRESENTLY PREFERRED EMBODIMENTS

Figure 1:
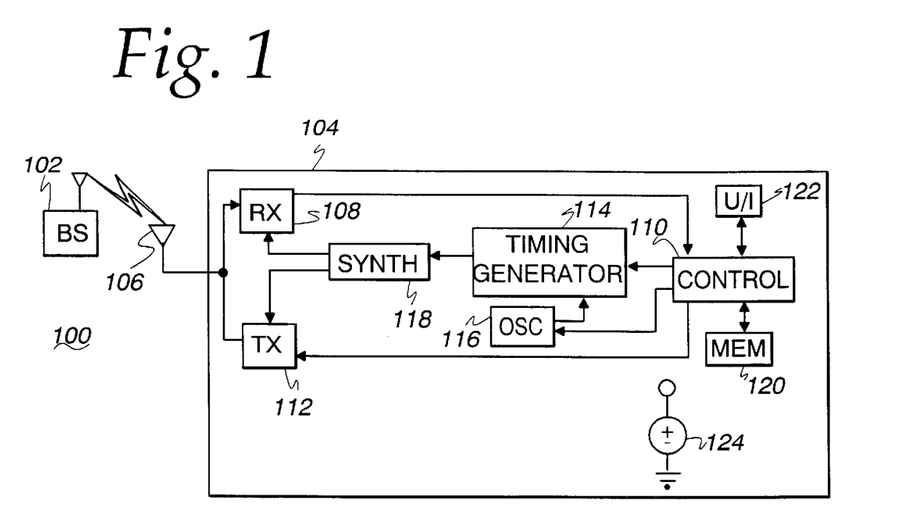
FIG. 1 is a block diagram of a radiotelephone system.

Referring now to the drawing, FIG. 1 is a block diagram illustrating a radiotelephone system 100. The radiotelephone system 100 includes a plurality of base stations such as base station 102 which may be in radiocommunication with a radiotelephone such as radiotelephone 104. In addition to voice and data communication, the base station 102 provides control signals including timing information to allow the radiotelephone 104 to be synchronized with the base station 102 and other fixed components of the system 100. In the exemplary embodiment, the system 100 is a cellular telephone system in accordance with a digital cellular standard, such as IS-136 of IS-136 published by the Telecommunications Industry Association/Electronic Industry Association and commonly referred to as TDMA or DAMPS. In other embodiments, the system 100 may be the Global System for Mobile Communication, or GSM or other systems.

The radiotelephone 104 is a portable radiotelephone such as a cellular telephone. The radiotelephone 104 includes a receiver circuit 108, a control circuit 110, a transmitter 112, a timing generator 114, an oscillator 116, a synthesizer 118, a memory 120 and a user interface 122. Operating power for the radiotelephone 104 is provided by a rechargeable battery 124. Radio signals received from the base station 102 are detected at the antenna 106 and converted to digital data for further processing by the received circuit 108. The control circuit 110 controls overall operation of the radiotelephone 104, in conjunction with data and instructions stored in the memory 120. For transmitting voice and data information from the radiotelephone 104 to the base station 102, information is conveyed from the control circuit 110 to the transmitter circuit 112. The transmitter circuit 112 modulates a carrier signal which is impressed upon the antenna 106 for transmission to the base station. The timing generator 114 controls all timing of the radiotelephone 104, including the air interface. The timing generator 114 operates in response to clocking signals provided by the oscillator 116. The synthesizer 118 provides the necessary signals for modulation and demodulation in the transmitter circuit 112 and receiver circuit 108 respectively. The user interface 122 permits user control of the radiotelephone 104. Generally, the user interface 122 includes a speaker and microphone, and a keypad and display.

Figure 2:
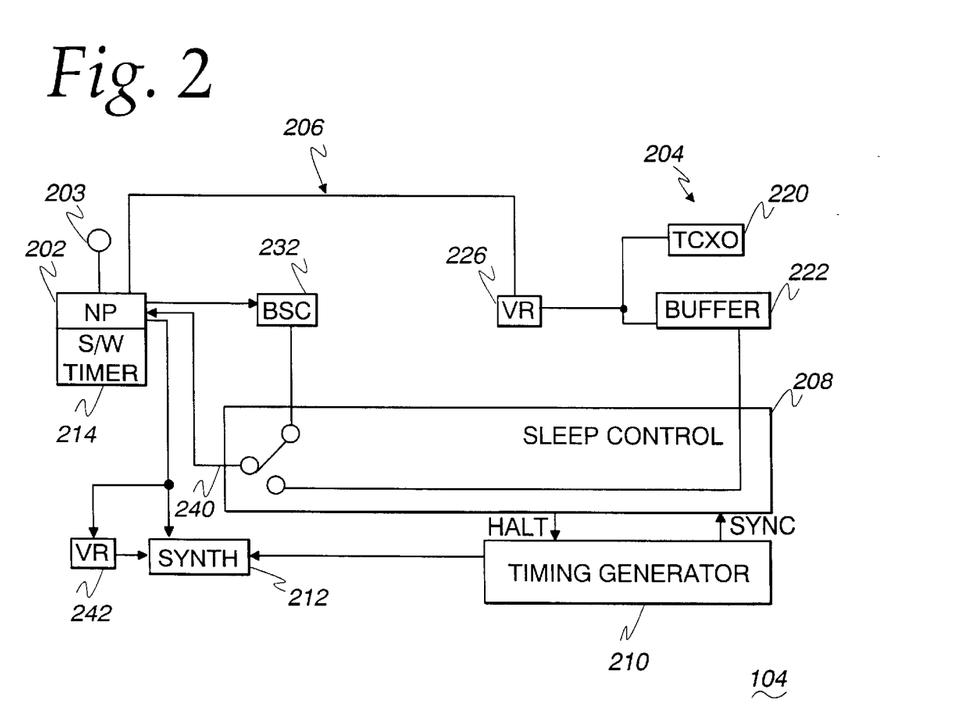
FIG. 2 is a block diagram of a portion of the radiotelephone illustrated in FIG. 1.

FIG. 2 is an operational block diagram of a portion of the radiotelephone 104 of FIG. 1. As illustrated in FIG. 2, the radiotelephone 104 includes a processor 202, an oscillator circuit 204, a second oscillator circuit 206, a sleep controller 208, a timing generator 210 and a synthesizer 212. The processor 202 controls operation of the radiotelephone 104 and in one embodiment is implemented as an Advanced Risc (Reduced Instruction Set Computer) Machine. The processor 202 operates in response to data and instructions stored in the processor 202 and in associated memory. The processor 202 implements a variety of functions. One such function is a software timer 214.

The processor 202 further implements a temperature sensor 203. Temperature sensitivity may be accomplished by any suitable circuit, device or software. The temperature sensor 203 provides an indication of the current temperature of the radiotelephone 104. The processor 202 may use this indication for subsequent processing.

The first oscillator circuit 204 includes a temperature compensated crystal oscillator 220, a buffer circuit 222, and a voltage regulator 226. The temperature controlled crystal oscillator 220 provides an oscillating signal at a substantially constant, first predetermined frequency. In one exemplary embodiment, this frequency is 19.44 MHz. The buffer circuit 222 receives the oscillating signal and buffers the signal for transmission to other circuits. The buffer circuit 222 performs functions such as signal squaring. The voltage regulator 226 provides a voltage which is substantially constant and compensated against variations in temperature and supply voltage. The voltage regulator circuit 226 has a control input for receiving a control signal from the processor 202. In response to the control signal, the voltage regulator 226 may be switched between a normal mode and a low-power sleep mode.

The second oscillator circuit 206 includes a second oscillator 232. The second oscillator 232 provides a substantially constant second predetermined frequency oscillating signal. In the illustrated example, the signal has a frequency of 32,768 Hz. The second oscillator 232 generates the oscillating signal and provides the oscillating signal to the sleep controller 208. The oscillator 232 has a control input for receiving a control signal from the processor 202. In response to a control signal, the oscillator 232 may be powered down to a low-power sleep mode.

The sleep control circuit 208 controls entry and exit from the low power sleep mode by the radiotelephone 104. In particular, the sleep control circuit 208 includes a switch 240 which selects between the output of the primary oscillator circuit 204 and the secondary oscillator circuit 206. The switch 240 may be controlled by software and may be any suitable switching circuit implemented in the radiotelephone 104. The switched signal is provided to the microprocessor 202 and to other portions of the radiotelephone 104 as a master clock signal. Thus, in normal mode, the primary oscillator signal, having a relatively high frequency such as 19.44 MHz, is provided as the master clock signal. In the sleep mode, the lower frequency signal from the second oscillator circuit 206 is provided with the frequency of, for example, 32,768 Hz. By providing the lower frequency signal during the low-power sleep mode, all the clocked circuits of the radiotelephone 104 which receive the master clock signal operate at a slower rate and therefore consume less power in the low-power sleep mode.

The timing generator 210 provides timing signals for other portions of the radiotelephone 104. In particular, the timing generator 210 provides timing signals required for synchronization of timing of the radiotelephone 104 with timing of the radiotelephone system in which the radiotelephone 104 operates. For example, if the radiotelephone system is a time division multiple access (TDMA) system, the radiotelephone 104 is assigned time slots of a TDMA frame for communicating with a base station in the system. Other similar radiotelephones are assigned other time slots in the frame. By assigning a single radio telephone such as the radiotelephone 104 to each time slot, communication is assured. To further ensure reliable communication, timing of the radiotelephone 104 must be closely synchronized with system timing so that the radiotelephone 104 transmits and receives only during its assigned time slot. The timing generator 210 provides a variety of control signals. Among these is a synchronization signal labeled Sync in FIG. 2. Further, the timing generator 210 receives a signal labeled Halt from the sleep controller 208. By asserting the Halt signal, the timing generator enters a low-power sleep mode to reduce power consumption in the radiotelephone 104.

The synthesizer 212 provides oscillator signals for modulation and demodulation during radio communication with a remote base station. The synthesizer includes a voltage regulator 242 which provides a substantially constant voltage for operation of the synthesizer 212.

As noted above, the radiotelephone 104 contains the timing generator 210 which generates different events necessary for the radiotelephone 104 to maintain radio interface timing. The events repeat with a certain period, usually equal to one TDMA frame. Typically, this frame period is 20 ms. If it is known in advance that no communication will take place over the radio interface for, for example, the next two frames, it is possible to shut down the radiotelephone for that period of time to conserve power. To maximize power savings it is desirable to turn off the high-frequency primary clock. However the timing generator uses that clock for event timing and thus radio interface timing would be lost. One solution to this problem is to have another means of accurately timing a frame period so that the timing generator can be stopped for an integer number of periods and then restarted without losing synchronization. The illustrated embodiment provides a sleep mode which uses a special sleep timer to wake up the timing generator at the end of a sleep cycle. The sleep timer counts a number of secondary clock pulses to measure the length of the sleep period. The secondary clock pulses are padded with a programmable number of primary clock pulses to achieve an accurate sleep period.

In one example, the primary clock frequency is 19.44 MHz, the secondary clock frequency is 32768 Hz and the sleep period (one TDMA frame) is 20 ms. Under these circumstances, one sleep period equals 32768 Hertz×20 ms.=655.36 secondary clock periods.

A sleep cycle starts on a primary clock period. Since the primary and secondary clocks are un-synchronized, it may take between zero and one secondary clock period before the start of the first period of the secondary clock signal. To solve this problem the first frame is measured as 654+1.36 secondary clock period, where the 1.36 secondary periods are measured using the primary clock signal. One secondary clock period equals 19.44 MHz/32768 Hz=593.26 primary clocks. 0.26 primary clock periods=13 ns and is insignificant relative to system timing.

For implementation of the clocks, two counters are used in the sleep timer. A primary counter counts primary clock cycles and a secondary counter counts secondary clock cycles. The primary counter is a down counter and it is preloaded with, for example, the value of 593. That is, the primary counter reaches zero after 593 primary clock cycles. The secondary counter in this example is an up counter which is preloaded with a zero value and counts upward, incrementing the counter until a comparison value is reached. Other suitable clocking circuits or software implementations may be used as well.

Figure 3:
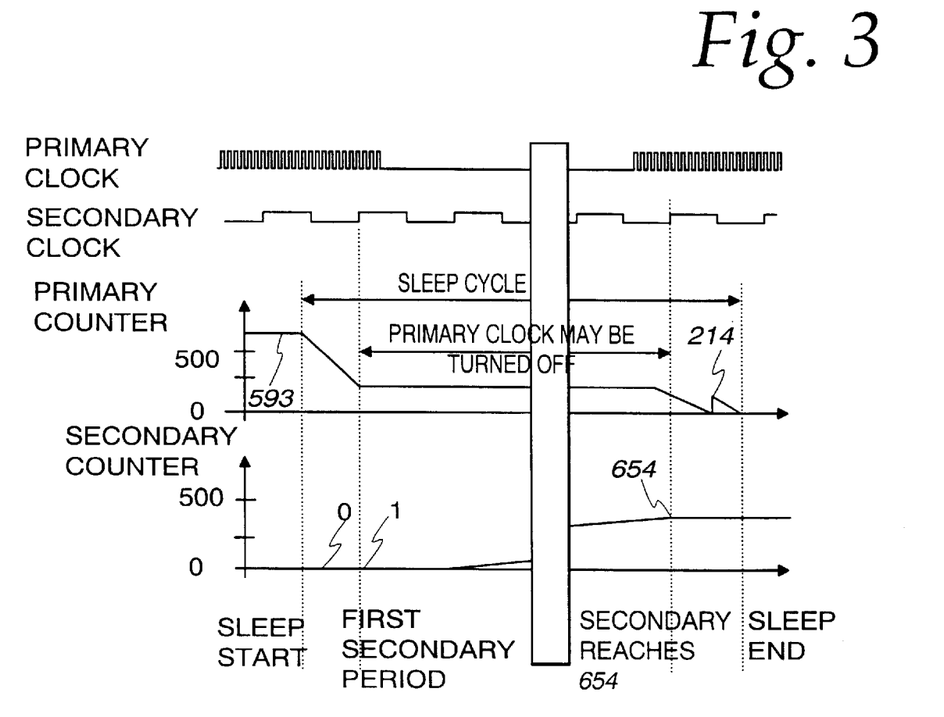
FIG. 3, FIG. 4 and FIG. 5 are timing diagrams illustrating operation of a sleep timer of the radiotelephone of FIG. 2.
Figure 5:
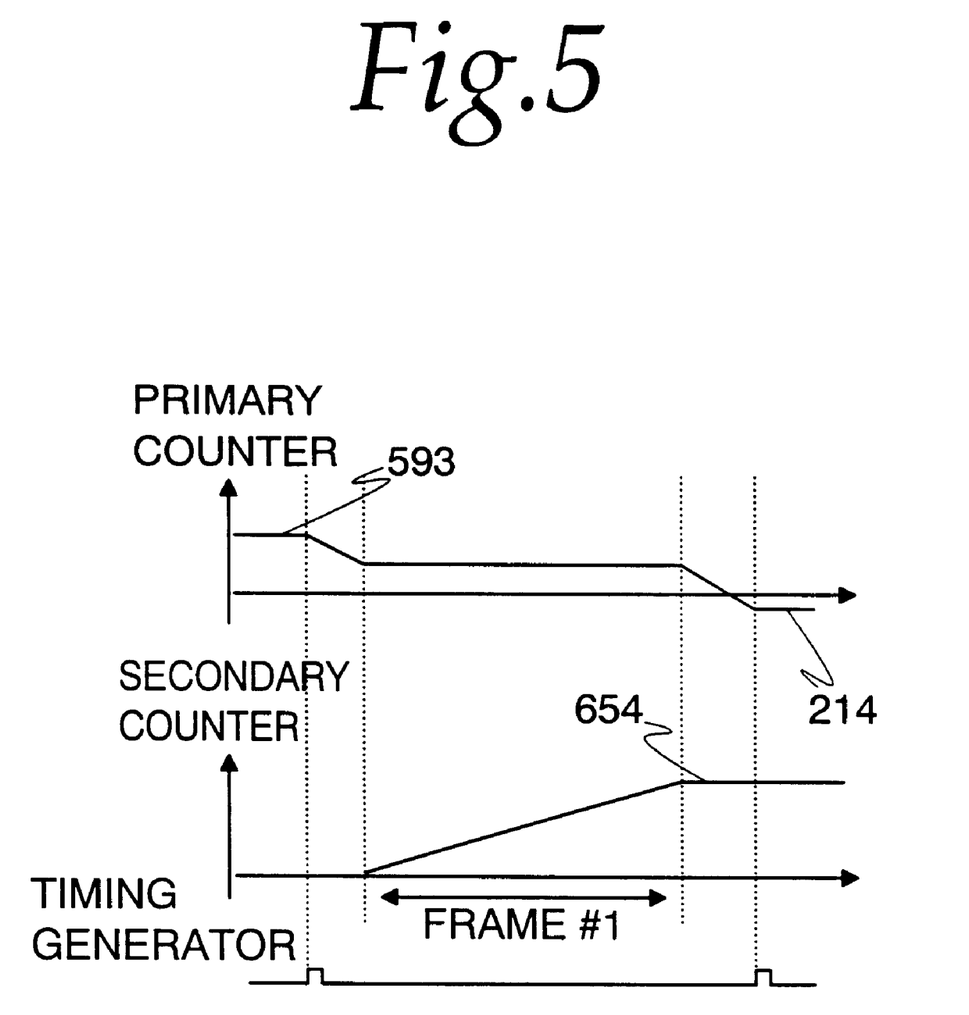
Figure 6A:
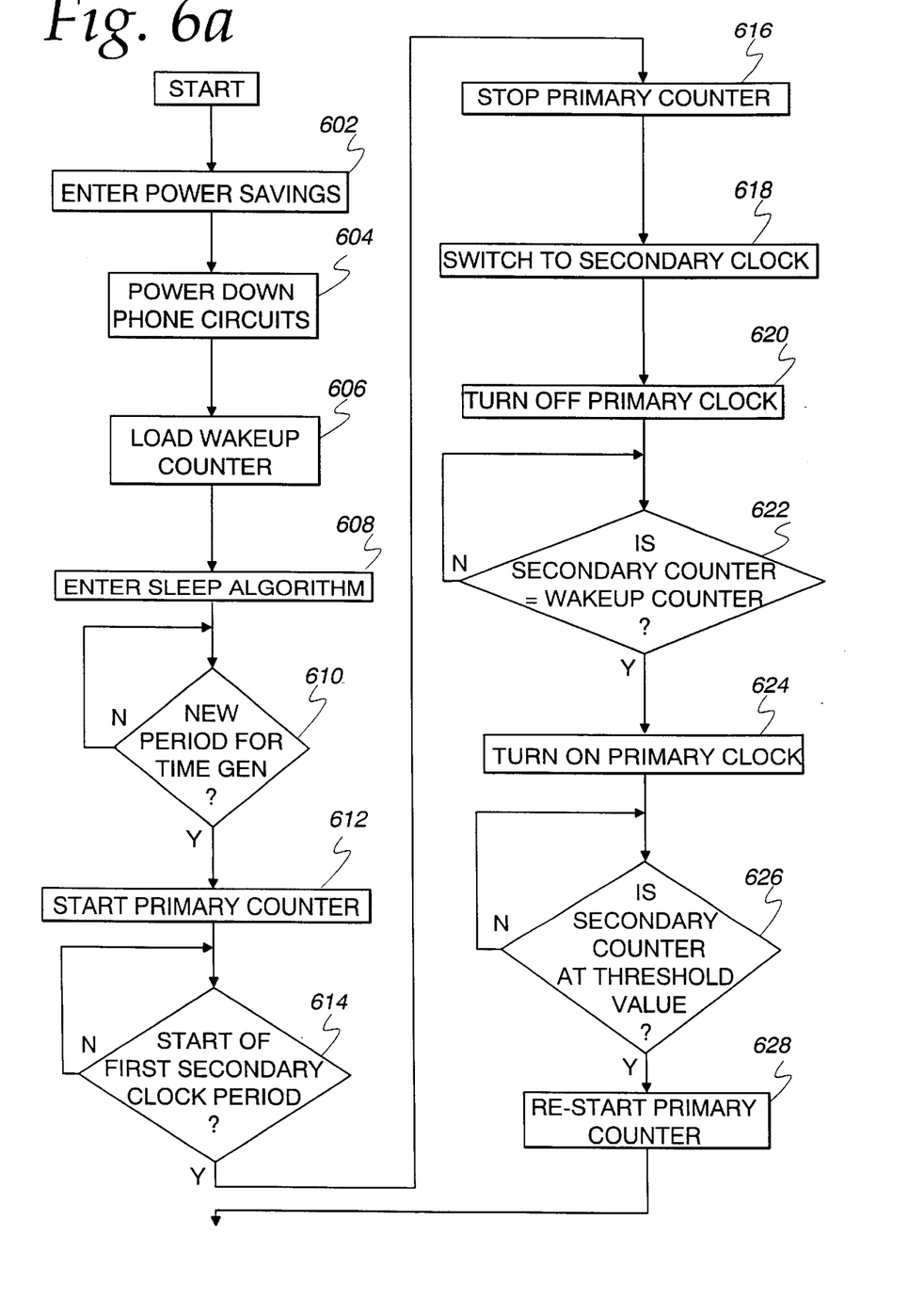
FIGS. 6a and 6b are a flow diagram illustrating a method of operating a radiotelephone.
Figure 6B:
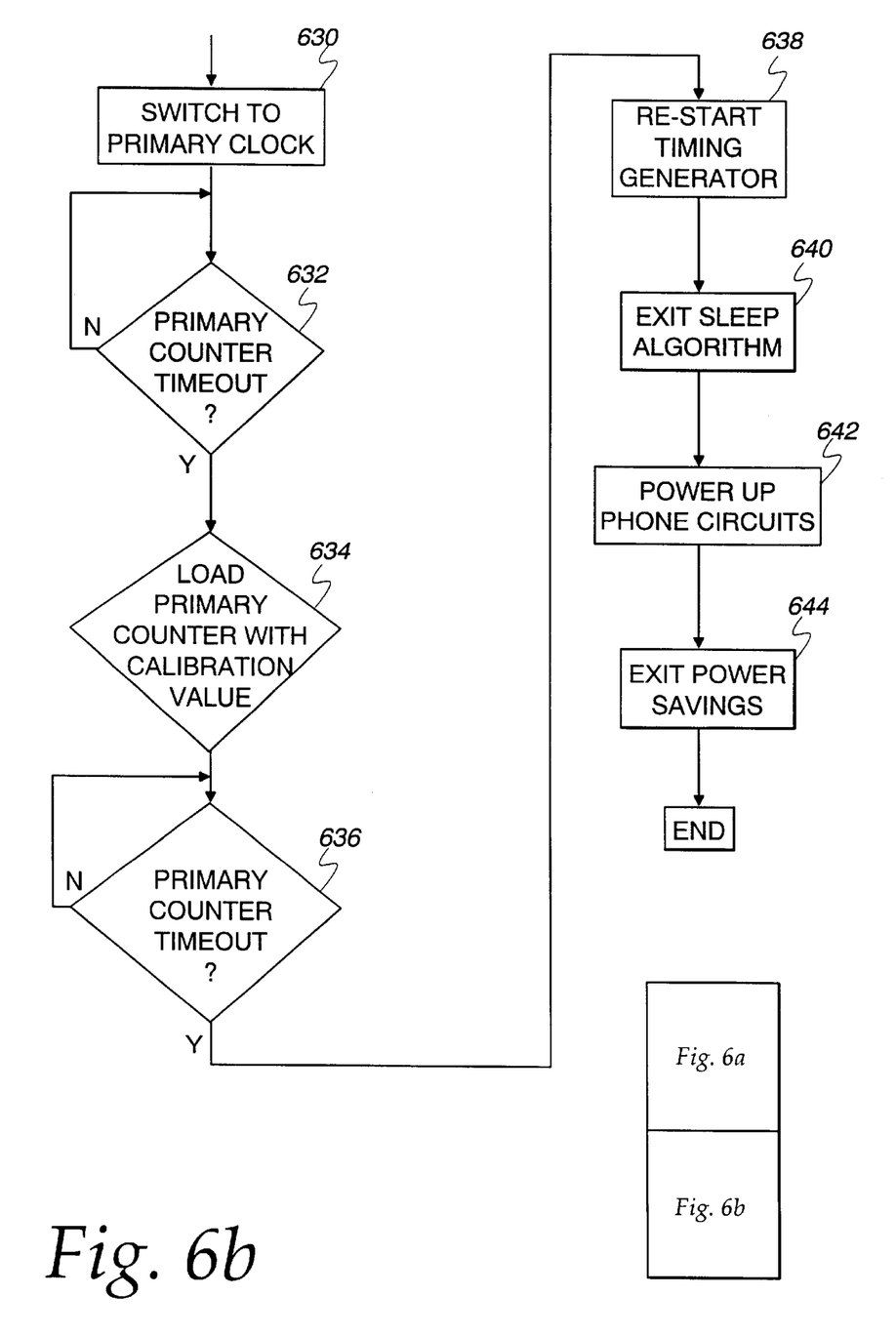

Operation of the sleep timer will be described in conjunction with the timing diagram of FIG. 3 and the flow diagram of FIGS. 6a and 6b. In the timing diagrams of FIGS. 3, 4 and 5 the numbers indicate number of clock periods of the primary counter (clock) and secondary counter (clock) during the designated time period. The steps illustrated in FIGS. 6a and 6b may be performed by the processor 202 (FIG. 1) of the radiotelephone 104. The radiotelephone enters the process at step 602.

The algorithm that controls the sleep timer can be thought of as a subset of the overall power savings algorithm of the radiotelephone's processor. Before the processor is ready to enter the sleep algorithm (at step 608), it must power down all the unneeded circuits in the radiotelephone, step 604, and load the TCXO wake up counter, step 606. The sleep timer starts just when the timing generator is about to begin a new period.

When the start of a new period is detected, step 610, the primary counter is started, step 612 and the timing generator is stopped. The primary counter responds to the primary clock signal of 19.44 MHz. The primary counter counts primary clocks until the beginning of the first secondary clock period. The processor remains in a loop, step 614, as it waits to detect the start of the first secondary clock period. At this point, the primary counter is stopped, step 616, and the hardware sleep controller switches the processor to run off the secondary clock at step 618. The sleep algorithm can gain additional power savings at this point by powering off the unused primary clock, step 620.

The secondary counter, operating at the low frequency of 32768 Hz, counts until it reaches the threshold value of the wakeup counter, step 622. This time out of the wakeup counter triggers the processor to power on the primary clock, step 624, to warm up the circuits in anticipation of switching the processor from 32768 Hz to 19.44 MHz at step 628. A warm up time allows the primary clock to stabilize at it's predetermined frequency. As the primary clock is warming up, the processor must keep counting secondary clocks to maintain the IS-136 system timing.

Once the secondary timer reaches the second threshold for system timing, step 626, the processor re-starts the primary counter, step 628 and gets switched back to run at the primary clock rate, step 630. The primary counter continues to count until it reaches zero or times out, step 632. When the primary counter reaches zero, it is loaded with a programmable calibration value. The calibration value is nominally 0.36×19.44 MHz/32768=214. The primary counter is loaded with the calibration value at step 634.

After the primary counter times out, step 636, the total time for sleep (primary and secondary clocks) has been reached and the timing generator can be restarted, step 638. The processor then exits the sleep algorithm, step 640, and then powers up the remaining phone circuits, step 642. The processor exits the power saving algorithm at step 644 and is ready to receive the next system information from the base station.

In summary, system timing for the radiotelephone system can be kept by synchronizing the secondary clock to the primary clock, switching to the secondary clock, powering down the unused primary clock, and counting secondary clocks until it is time to wake up again. In order to save current, it is desirable to wake up the primary clock as late as possible. One way to optimize the current savings is to program the wake up counter as a function of temperature. This idea can be expanded to have the microprocessor power up other circuits of the radiotelephone as a function of temperature.

Figure 4:
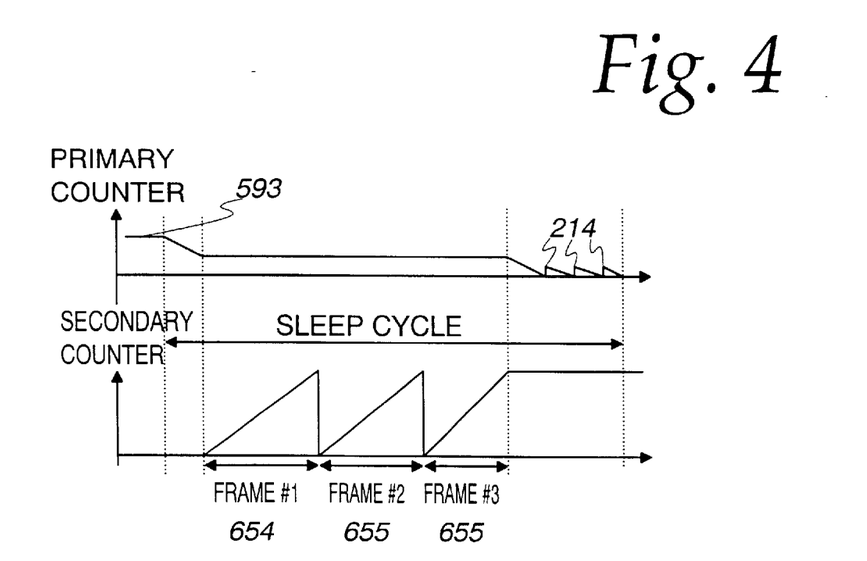

FIG. 4 illustrates timing for sleep periods that are longer than one TDMA frame in duration. Under these circumstances, after the first frame, the secondary counter counts from zero to 654. At the end of the sleep cycle, when the primary counter reaches zero, it is loaded with the calibration value and decremented to zero once for every frame in the cycle. FIG. 4 illustrates a three frame sleep cycle. FIG. 4 is not drawn to scale for ease of illustrating operation of the timers.

Calibration is performed very similarly to a one-frame sleep cycle. FIG. 5 illustrates the process. The difference from the one-frame sleep cycle is that the timing generator is not stopped. When the primary counter reaches zero at the end of the cycle, the counter continues to decrement until the timing generator period ends. When the period is over, the negative value stored in the primary counter is complemented (sign reversed) and loaded into a calibration register. If the secondary clock has a frequency deviation, the calibration value will deviate from the nominal 214.

Figure 7:
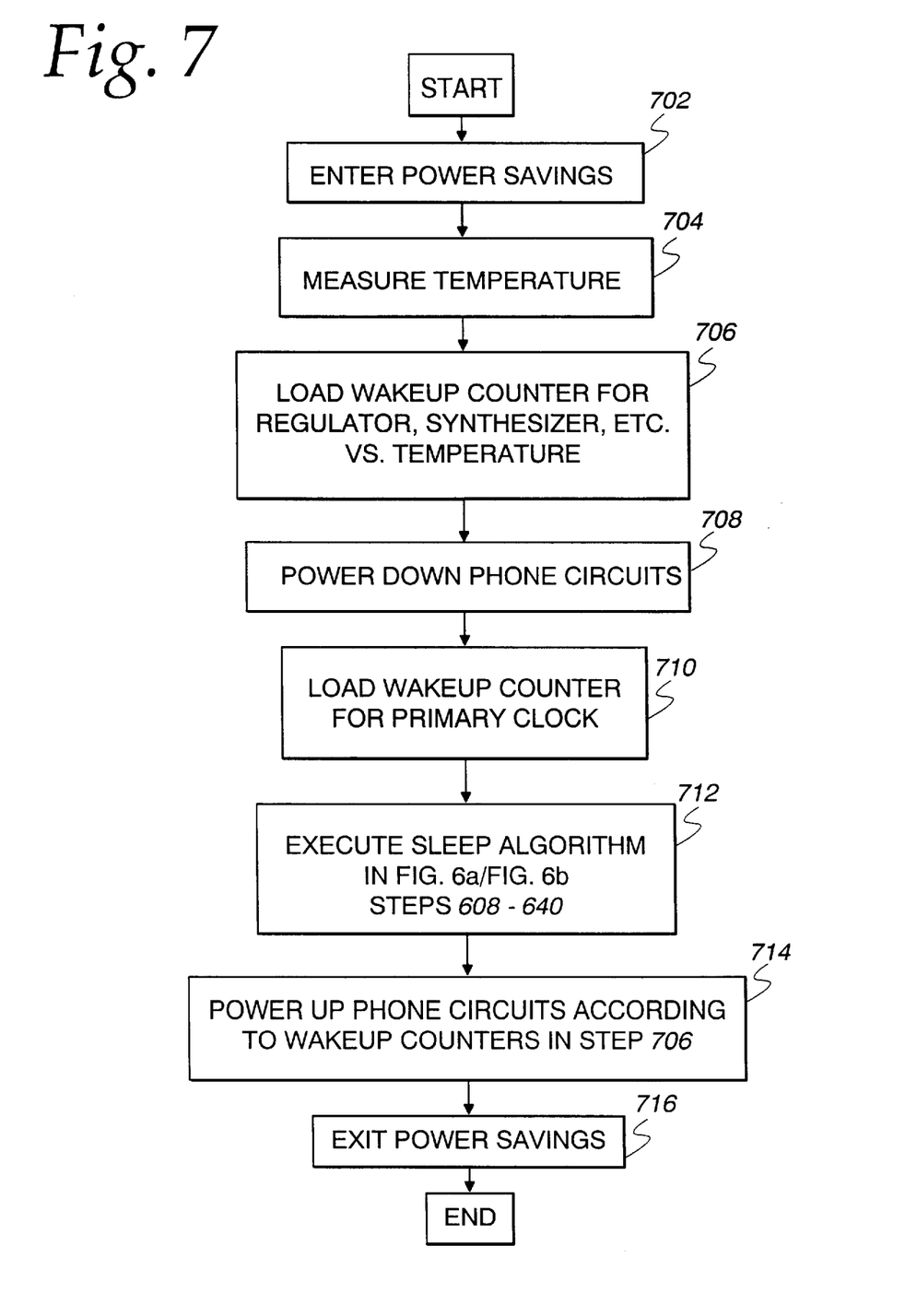
FIG. 7 is a flow diagram illustrating a method of operating a radiotelephone.

FIG. 7 illustrates how the power savings and sleep algorithm can be temperature compensated. The radiotelephone enters the power savings algorithm at step 702. The radiotelephone measures the temperature at step 704. For each circuit, the processor associates a wakeup counter whose value is a function of temperature, step 706. Then at step 708 the processor powers down the unneeded circuits. Similarly, the sleep controller's wake up timer can be programmed as a function of temperature, step 710. At step 712, the processor executes the sleep algorithm illustrated as steps 608–640 in FIGS. 6a and 6b. At step 714, circuits of the radiotelephone are powered up according to the wakeup counters. The power savings algorithm is exited at step 716.

From the foregoing, it can be seen that the present invention provides an improved method and apparatus for controlling entry to and exit from a low-power sleep mode in an electronic device such as a radiotelephone. By measuring the temperature and tailoring the start-up times of individual circuitry blocks to the measured temperature, the start-up times can be delayed as long as possible, thus maximizing the power savings of the sleep mode. Further, a sleep timer counts the number of secondary clock pulses to measure the duration of the sleep period while the remainder of the radiotelephone circuitry is powered down. In order to ensure accurate timing and synchronization with system timing upon exit from the sleep mode, the secondary clock pulses are padded with a programmable calibration value which includes a number of primary clock pulses necessary to achieve an accurate sleep period.

While a particular embodiment of the present invention has been shown and described, modifications may be made. It is therefore intended in the appended claims to cover all such changes and modifications which follow in the true spirit and scope of the invention.

What is claimed is:

1. A method for operating a radiotelephone, the method comprising the steps of:
   (a) determining a predetermined wakeup time;
   (b) entering a low-power sleep mode;
   (c) at the predetermined wakeup time,
      (c1) determining a temperature of the radiotelephone;
      (c2) setting a variable wakeup duration in response to the temperature; and
      (c3) after the variable wakeup duration, returning to a normal operational mode.

2. The method of claim 1 wherein step (c3) comprises:
   providing operational power to one or more circuits after the variable wakeup duration.

3. The method of claim 2 wherein step (c3) comprises providing operational power to an oscillator a sufficient time before providing power to other timing circuitry to ensure stable operation of the oscillator at the temperature.

4. A method for operating a radiotelephone, the method comprising the steps of:
   (a) determining a predetermined wakeup time;
   (b) removing power from operating circuitry of the radiotelephone to enter a low power sleep mode;
   (c) in response to clocking signals, timing duration of the low power sleep mode;

at the end of the low power sleep mode, (d) measuring temperature;

(e) setting a software timer to measure a wakeup time having a wakeup duration based on the temperature;

(f) clocking the software timer; and (g) after the wakeup duration, providing power to operating circuitry.

5. The method of claim 4 wherein step (c) comprises:

(c1) clocking a counter; and (c2) when the counter reaches a predetermined value, exiting the low power sleep mode.

6. The method of claim 5 wherein step (e) comprises the steps of:

(e1) storing a value in a register;

(e2) in response to a clock signal, decrementing the value; and (e3) when the value matches a predetermined value, providing power to the operating circuitry.

7. A method for operating a radiotelephone, the method comprising the steps of:

(a) entering a low power sleep mode;

(b) using a hardware clock to measure a wakeup time;

(c) at the wakeup time,
 (c1) providing operational power to predetermined circuitry of the radiotelephone;
 (c2) starting a software clock;

(d) measuring a predetermined time duration with the software clock; and (e) after the predetermined time duration, providing operating power to additional circuitry.

8. The method of claim 7 wherein step (b) comprises:

(b1) clocking a counter; and (b2) when the counter reaches a predetermined value, providing operational power to a processor.

9. The method of claim 8 wherein step (d) comprises the steps of:

(d1) storing a value in a register;

(d2) in response to a clock signal, decrementing the value; and (d3) terminating the software clock when the value matches a predetermined value.

10. A method for operating a portable radiotelephone in a radiotelephone system, the method comprising the steps of:

using a high resolution primary timer, timing operation of the radiotelephone in synchronization with timing of the radiotelephone system;

entering a low power sleep mode;

timing duration of the low power sleep mode using a low resolution secondary timer;

timing a calibration duration using the primary timer to synchronize the timing of the radiotelephone with the timing of the radiotelephone system; and exiting the sleep mode.

11. The method of claim 10 wherein the step of timing duration of the low power sleep mode comprises the steps of:

determining a comparison value related to the duration of the low power sleep mode; and incrementing a counter until the comparison value is reached.

12. The method of claim 11 wherein the steps of timing using the primary timer comprise the steps of:

storing a timer value in a counter; and decrementing the counter until a zero value is reached.

13. A method for operating a portable radiotelephone in a radiotelephone system, the method comprising the steps of:

entering a low power sleep mode;

timing a predetermined sleep duration;

at end of the sleep duration, activating a primary clock;

timing a warmup duration;

after the warmup duration, activating the primary clock;

timing a calibration duration with the primary clock; and at the end of the calibration duration, exiting the sleep mode.

14. The method of claim 13 wherein the step of timing the predetermined sleep duration comprises a step of timing decrementing a secondary counter in response to signals from a secondary clock until a predetermined value is reached.

15. The method of claim 14 further comprising the steps of:

powering down unneeded circuits of the radiotelephone;

detecting a new period of a timing generator of the radiotelephone;

in response to the new period, starting the primary counter;

detecting a first period of the secondary clock; and stopping the primary clock and timing operation of the radiotelephone using the secondary clock.

16. The method of claim 15 further comprising the steps of:

restarting the timing generator after the calibration duration;

powering up all necessary circuits of the radiotelephone; and reattaining communication with a remote base station.

* * * * *